(No Model.)
P. PATTERSON.
TUBE.
No. 318,286. Patented May 19, 1885.
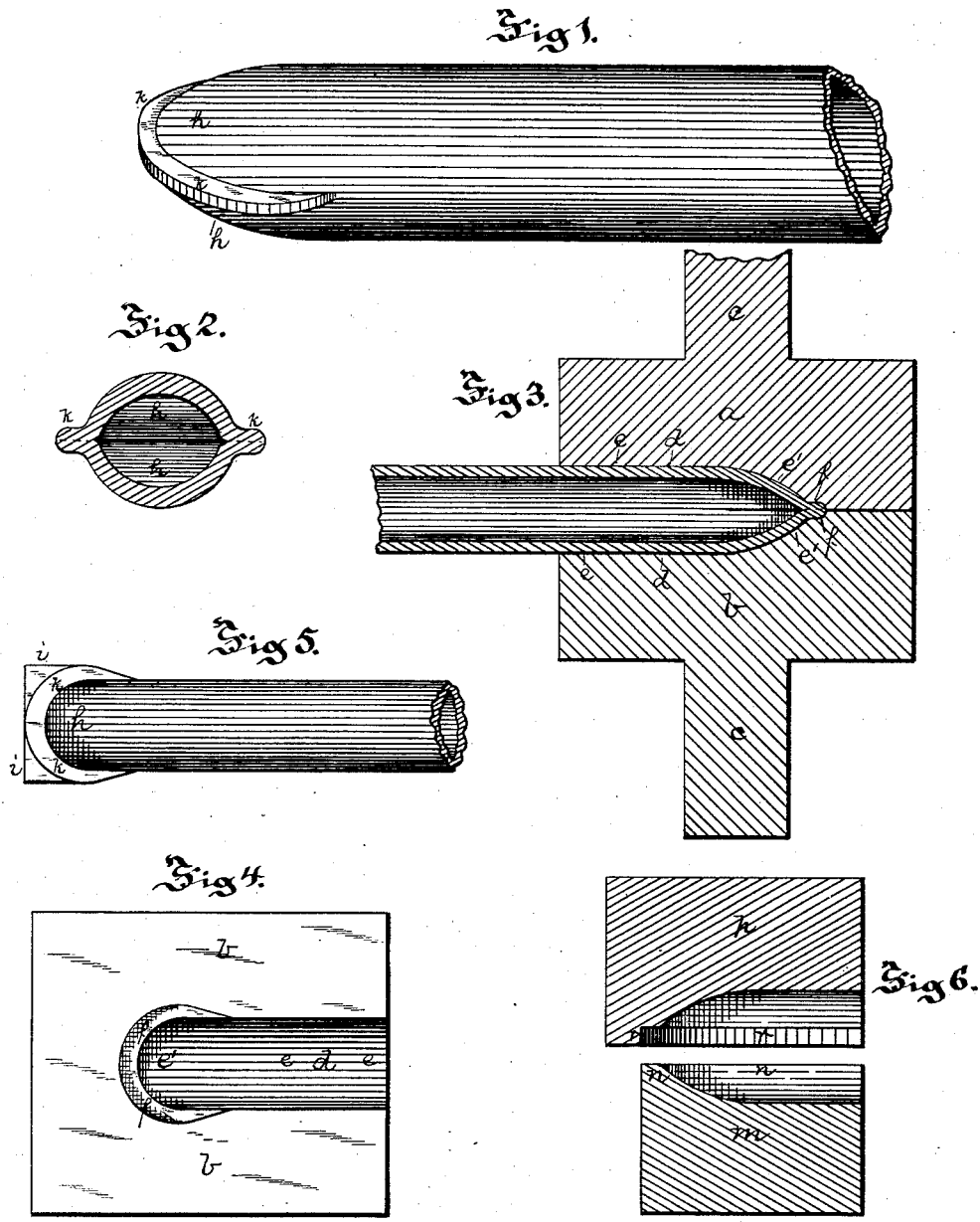
Witnesses.
J. Cooke
Lewis McMullen
Inventor.
Peter Patterson
By James T. Ray
Attorney

UNITED STATES PATENT OFFICE.

PETER PATTERSON, OF McKEESPORT, PA., ASSIGNOR TO THE NATIONAL TUBE WORKS COMPANY, OF SAME PLACE AND OF BOSTON, MASS.

TUBE.

SPECIFICATION forming part of Letters Patent No. 318,286, dated May 19, 1885.

Application filed July 24, 1884. (No model.)

*To all whom it may concern:*

Be it known that I, PETER PATTERSON, of McKeesport, in the county of Allegheny and State of Pennsylvania, have invented a new and useful Improvement in the Mode of Closing the ends of Tubes; and I do hereby declare the following to be a full, clear, and exact description thereof, reference being had to the accompanying drawings, forming a part of this specification.

My invention relates to closing and welding the ends of wrought-metal tubes, these tubes, having closed and welded ends, being employed in steam-radiators and for other purposes. Heretofore these tubes have been generally welded by hand, the end of the tube being heated, and, by blows on the ends thereof, the tubes being upset and the edges gradually drawn together. As it was difficult and laborious to weld these tubes properly in this manner and to give a neat finish to the ends of the welded tube, apparatus has been employed for welding the ends in which the end of the tube was heated, and was drawn together by means of a revolving die having a semi-cylindrical recess provided with spiral corrugations, into which recess the heated end of the tube was pressed and spun shut; and though this apparatus gave a uniform finish to the end of the tube it was found in use that the central point or apex of the weld was often imperfectly welded, and consequently that the tube leaked at that point. The apparatus employed for this purpose was complicated and hard to keep in order; and the object of my invention is to overcome these several objections in connection with the welding of the ends of these wrought-metal tubes.

It consists, essentially, in a wrought-metal tube having a closed and welded end, the weld thereof extending in the form of a lip across the end of the tube.

To enable others skilled in the art to make and use my invention, I will describe the same, referring to the accompanying drawings, in which—

Figure 1 is a perspective view of the finishing-tube having a welded end. Fig. 2 is a cross-section of the tube across the weld. Fig. 3 is a longitudinal vertical section of the dies employed for welding, showing the welded tube within the dies. Fig. 4 is a face view of one of the dies. Fig. 5 is a top view of the tube after welding, and Fig. 6 is a longitudinal central section of the shearing-dies for removing the fin.

Like letters of reference indicate like parts in each.

The dies for welding the ends of the tube may be operated by means of a suitable hammer, hydraulic or other similar press, and as the construction of these are well known, I have only illustrated the dies, which may be secured in any suitable manner therein.

The welding-dies $a$ $b$ are both substantially the same construction and shape, and they are provided with a dovetail or other suitable projection, $c$, for securing them in the hammer or press. In each die is formed the recess $d$, for the reception of the end of the pipe, said recess being semi-cylindrical at its entrance, as at $e$, to support the body of the pipe, and gradually decreasing in depth to a flat welding-seat, $f$, in which the end of the tube fits, by means of which the inner faces of the end of the pipe are pressed together. The exact shape of this welding-seat $f$ will of course depend on the shape desired to be imparted to the finished welded end of the tube; but I prefer the shape illustrated in the drawings, the welding-seat $f$ extending in a gradual curve around the end of the recess $d$, and said recess tapering off from its cylindrical shape at the entrance $e$, as at $e'$, and vanishing into said welding-seat $f$. The welding-seat $f$ in each die is somewhat less in depth than the thickness of the tubing at its entrance, and gradually decreases in depth, so that, when the end of the tube is placed within the welding-dies, as the dies come together they will flatten out the end of the tube, and then press the inner faces of the lips formed firmly together within this welding-seat $f$ and weld the inner faces to each other. As the end of the tube will be broadened, and thus flattened out, the outer edges of the welding-seat $f$ are farther apart than the ordinary diameter of the cylindrical tube, and the tube when flattened out is first pressed into said welding-seat and closed, and then welded together.

The tube is first brought to a welding-heat in a suitable furnace, and then placed on the anvil-die b, its edge resting against the outer wall of the welding-seat f at the center of said seat or in the axial line of the tube, and the upper die, a, in striking or pressing on said pipe, first flattens the end thereof, closing it, and causing it to conform to the shape of the die, at the same time drawing the portions h near the ends toward each other, so as to give a neat curving finish thereto, and then compresses the end of the tube within the welding-seats f, and so welds the inner faces of the lips or ends of the tube together, forming the lip or fish-mouth weld k at the end of the tube, extending in a gradual curve around the end of the tube.

During this operation there will be a portion of the metal pipe spread beyond the welding-seats, the fins i formed extending out, as illustrated in Fig. 5 of the drawings; and to remove this fin and impart the proper finish to the pipe, the shearing-dies shown in Fig. 6 are employed. These dies consist of the anvil-die m, conforming substantially in outward contour to the shape to be given to the finished welded lip k at the end of the tube, and having the lip n, on which the welded lip k rests, and the reciprocating die p, having the shearing-edge r, corresponding in shape to the outward contour of the lip k of the finished tube, and the tube, after its end is welded, as above described, is placed on the anvil-die m, the fin portion i extending beyond the lip n, and the shearing-die shears off this fin portion i between its lip r and the lip n of the anvil-die m, thus forming the finished welded end of the tubing.

The welded end, having the finish above-described, presents a very neat appearance, the welded lip k and curved faces h being as neat as the ordinary semi-spherical end usually imparted in welding by hand or by the apparatus above referred to, and the weld formed is as perfect as can be obtained, as it may be made much thicker than the thickness of the pipe, and therefore all liability to leakage through the weld be overcome. This is illustrated in Figs. 2 and 3 of the drawings, where the welded portion is about twice the thickness of the metal of the pipe. These pipes may be closed together and welded in this manner very rapidly and at but little cost, as, except the dies above-described, they require no special machinery for the purpose, the dies operating equally well in any hammer or press, and but a few blows being necessary to both weld together the end and shear off any fin or surplus metal.

If desired, the welding-dies and the shearing-dies may both be secured to the same hammer or press, and as soon as the end of the tube is welded the operator places it on the shears and removes the fins.

What I claim as my invention, and desire to secure by Letters Patent, is—

1. A wrought-metal tube having a closed and welded end, the weld thereof being formed between the inner faces of the tube, substantially as set forth.

2. A wrought-metal tube having a closed and welded end, the weld thereof extending in the form of a lip across the end of the tube, substantially as set forth.

3. A wrought-metal tube having a closed and welded end, the weld thereof extending across the end of the tube, and the faces of the tube gradually approaching said weld, substantially as set forth.

In testimony whereof I, the said PETER PATTERSON, have hereunto set my hand.

PETER PATTERSON.

Witnesses:
GEORGE MARS,
GEORGE RUSSELL.